United States Patent
Hamano (10) Patent No.: US 8,160,437 B2
(45) Date of Patent: Apr. 17, 2012

(54) FOCUS DETECTION APPARATUS

(75) Inventor: Hideyuki Hamano, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 29 days.

(21) Appl. No.: 12/889,616

(22) Filed: Sep. 24, 2010

(65) Prior Publication Data

US 2011/0110655 A1     May 12, 2011

(30) Foreign Application Priority Data

Nov. 9, 2009  (JP) ................................. 2009-256541

(51) Int. Cl.
G03B 7/28     (2006.01)
G03B 7/099    (2006.01)

(52) U.S. Cl. ........................................ 396/114

(58) Field of Classification Search .................. 396/113, 396/114, 115
See application file for complete search history.

(56) References Cited

U.S. PATENT DOCUMENTS

| | | | |
|---|---|---|---|
| 5,202,718 A * | 4/1993 | Uchiyama | 396/104 |
| 5,257,062 A * | 10/1993 | Moriyama | 396/114 |
| 5,262,819 A * | 11/1993 | Ohtaka et al. | 396/114 |
| 5,532,781 A * | 7/1996 | Utagawa et al. | 396/114 |
| 5,572,282 A * | 11/1996 | Uchiyama | 396/125 |
| 5,771,413 A * | 6/1998 | Suda et al. | 396/114 |
| 6,072,956 A | 6/2000 | Hamada et al. | |
| 2002/0025156 A1 * | 2/2002 | Kuwata et al. | 396/114 |
| 2007/0109440 A1 | 5/2007 | Hamano | |
| 2011/0176793 A1 * | 7/2011 | Shu | 396/114 |

FOREIGN PATENT DOCUMENTS

JP    11-281877 A    10/1999
JP    2007-139935 A    6/2007

* cited by examiner

*Primary Examiner* — Christopher Mahoney
(74) *Attorney, Agent, or Firm* — Fitzpatrick, Cella, Harper & Scinto (57) ABSTRACT

A focus detection apparatus comprises a field mask which has a rectangular opening, a first focus detection optical system which divides, in a longitudinal direction of the opening or a shorter side direction of the opening, the light beam, a second focus detection optical system which divides, in an oblique direction, the light beam, a plurality of first focus detection regions which respectively extend in the dividing direction by the first focus detection optical system within a frame on an expected imaging surface of the imaging lens, and a plurality of second focus detection regions which respectively extend in the dividing direction by the second focus detection optical system within the frame that receives the light beam divided by the second focus detection optical system, the plurality of second focus detection regions being aligned in the longitudinal direction or the shorter side direction within the frame.

5 Claims, 9 Drawing Sheets

FOCUS DETECTION APPARATUS

BACKGROUND OF THE INVENTION

1. Field of the Invention

The present invention relates to a focus detection apparatus.

2. Description of the Related Art

As image capturing apparatuses represented by a digital camera and a video camera prevail, there has been an increasing demand for higher quality and downsizing of the image capturing apparatuses. More specifically, it has been desired to achieve higher precision and downsizing of a focus detection apparatus which detects the focus state of an imaging lens (imaging optical system) of an image capturing apparatus. In recent years, a focus detection apparatus which utilizes a TTL phase difference detection method for detecting the focus state of the imaging lens based on a relative positional relationship between a plurality of optical images formed by light beams passing through a plurality of regions obtained by dividing the pupil of the imaging lens is becoming the mainstream.

Such a focus detection apparatus described above forms a pair of images on a pair of light-receiving element arrays using a pair of lens portions formed on the incident surface of a secondary imaging lens, and a pair of prism portions formed on the exit surface. As an imaging lens goes out of focus, the pair of images move in a correlation direction as a direction in which a pair of openings are aligned. It is, therefore, possible to provide a focus detection apparatus that can detect a focus in a wide range within a photographing frame by arranging a plurality of focus detection regions in a direction perpendicular to the correlation direction. In, for example, Japanese Patent Laid-Open No. 2007-139935, a plurality of focus detection regions are arranged in the horizontal and vertical directions with respect to a photographing frame.

Japanese Patent Laid-Open No. 11-281877 describes a focus position detection apparatus, in which the first and second cross sensors which form an angle of about 45° with respect to each other are provided in the center of a frame.

As in Japanese Patent Laid-Open No. 2007-139935, arranging a plurality of focus detection regions in a direction perpendicular to the correlation direction as a direction in which the pair of openings are aligned has been conventionally considered. However, arranging a plurality of focus detection regions in an oblique direction as described in Japanese Patent Laid-Open No. 11-281877 has not been considered.

With reference to Japanese Patent Laid-Open No. 2007-139935, to densely arrange a plurality of focus detection regions in an oblique direction as described in Japanese Patent Laid-Open No. 11-281877, a plurality of focus detection regions are preferably arranged in a direction perpendicular to the correlation direction.

On the other hand, objects such as buildings, artificial objects, or eyebrows often have contrast in the horizontal or vertical direction. It is, therefore, easier to recognize the contrast of an object when a focus detection region extends in the horizontal or vertical direction as compared with an oblique direction. A field mask limiting a light beam for focus detection generally has a shape suitable for focus detection in the horizontal or vertical direction.

SUMMARY OF THE INVENTION

In the present invention, focus detection regions in an oblique direction are efficiently arranged within a frame.

According to a first aspect of the present invention, there is provided a focus detection apparatus for dividing a light beam which has passed through an imaging lens, and detecting a focus state of the imaging lens in accordance with a relative positional relationship between a plurality of images formed by the divided light beams, comprising: a field mask which has a rectangular opening for limiting the light beam that has passed through the imaging lens; a first focus detection optical system which divides, in a longitudinal direction of the opening or a shorter side direction of the opening, the light beam limited by the opening; a second focus detection optical system which divides, in an oblique direction different from the longitudinal direction or the shorter side direction, the light beam limited by the opening; a plurality of first focus detection regions which respectively extend in the dividing direction by the first focus detection optical system within a frame on an expected imaging surface of the imaging lens that receives the light beam divided by the first focus detection optical system; and a plurality of second focus detection regions which respectively extend in the dividing direction by the second focus detection optical system within the frame that receives the light beam divided by the second focus detection optical system, the plurality of second focus detection regions being aligned in the longitudinal direction or the shorter side direction within the frame.

According to a second aspect of the present invention, there is provided a focus detection apparatus for dividing a light beam which has passed through an imaging lens, and detecting a focus state of the imaging lens in accordance with a relative positional relationship between a plurality of images formed by the divided light beams, comprising: a field mask which has a rectangular opening for limiting the light beam that has passed through the imaging lens; a first focus detection optical system which divides, in a first direction of the opening or a second direction of the opening, the light beam limited by the opening; a second focus detection optical system which divides, in a third direction different from the first direction or the second direction, the light beam limited by the opening; a plurality of first focus detection regions which respectively extend in the dividing direction by the first focus detection optical system within a frame on an expected imaging surface of the imaging lens that receives the light beam divided by the first focus detection optical system; and a plurality of second focus detection regions which respectively extend in the dividing direction by the second focus detection optical system within the frame that receives the light beam divided by the second focus detection optical system, the plurality of second focus detection regions being aligned in the first direction or the second direction within the frame.

Further features of the present invention will become apparent from the following description of exemplary embodiments with reference to the attached drawings.

DESCRIPTION OF THE EMBODIMENTS

The schematic arrangement of an image capturing apparatus 1 including a focus detection apparatus 100 according to an embodiment of the present invention will be explained using FIG. 1.

Figure 1:
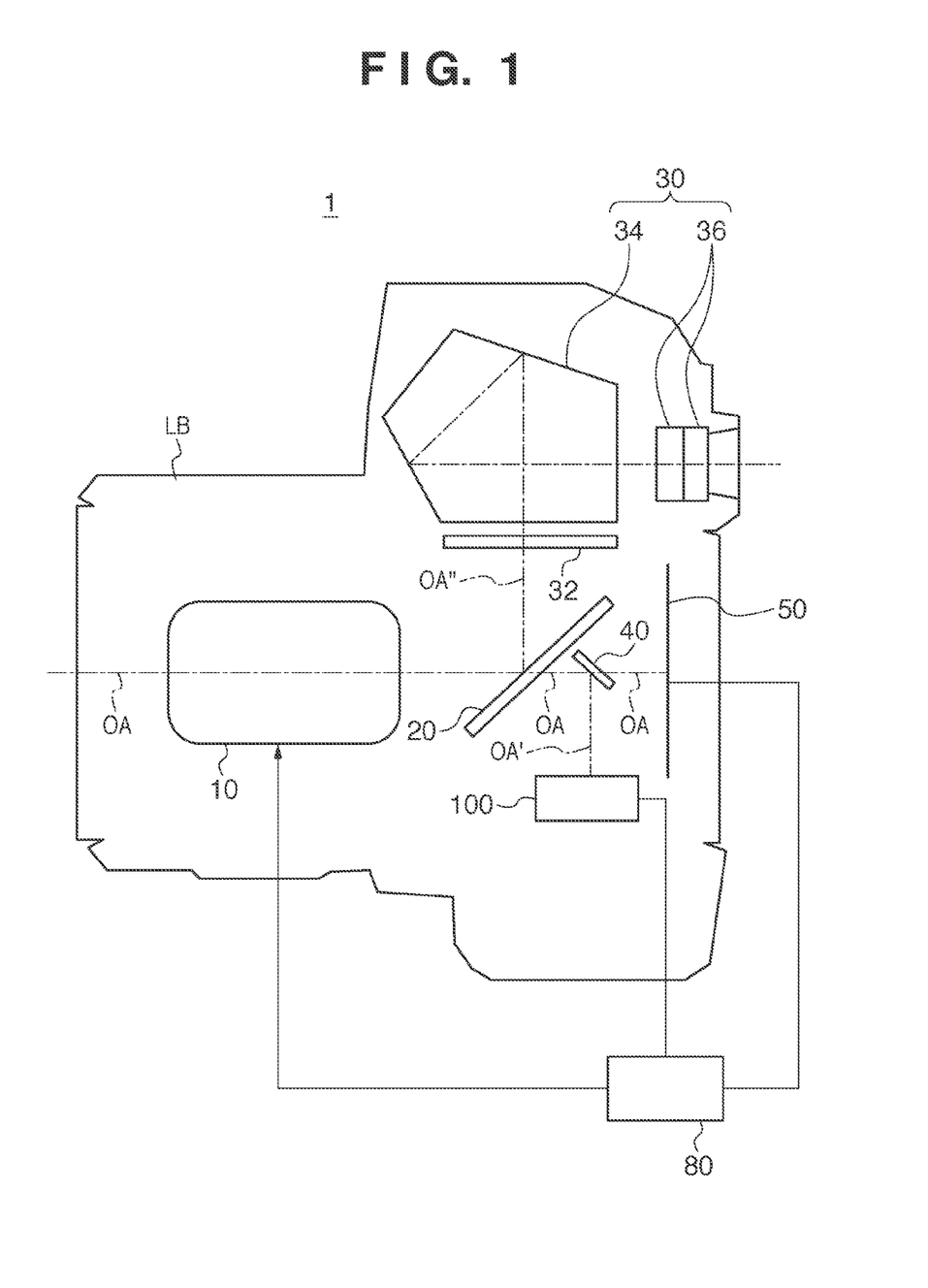
FIG. 1 is a view showing the schematic arrangement of an image capturing apparatus including a focus detection apparatus 100 according to an embodiment of the present invention.

The image capturing apparatus 1 has an imaging lens 10 and a camera main body, as shown in FIG. 1. The camera main body is configured such that the imaging lens 10 is detachable via a mount unit (not shown). The image capturing apparatus 1 serves as, for example, a single-lens reflex camera.

The imaging lens 10 is an exchangeable imaging lens for capturing objects, and has an imaging optical system including a focus adjustment lens (not shown). The focus (state) of imaging lens 10 is adjusted by a control unit 80 (to be described later) through the focus adjustment lens based on the result of focus detection processing by the focus detection apparatus 100 (to be described later). A lens barrel LB so as to be movable in the direction of an optical axis OA supports the imaging lens 10. Note that the imaging lens 10 is not a component of the image capturing apparatus 1 when it is detached from the camera main body, but the imaging lens 10 is considered herein as a component of the image capturing apparatus 1 since it is essential to attach the imaging lens 10 to the camera main body when the focus detection apparatus 100 detects a focus.

The camera main body has a main mirror 20, a finder optical system 30, a sub-mirror 40, an image sensor 50, the focus detection apparatus 100, and the control unit 80.

The main mirror 20 is a semitransparent half mirror, or a movable mirror partly having a half mirror surface. The main mirror 20 reflects part of light which has passed through the imaging lens 10, and guides the reflected light to the finder optical system 30 (to be described later) along an optical axis OA''. Also, the main mirror 20 transmits part of the light which has passed through the imaging lens 10, and guides the transmitted light to the sub-mirror 40 (to be described later) along the optical axis OA.

The finder optical system 30 is used for observing an object to be captured. In other words, the finder optical system 30 provides a user with a pseudo image for observation equivalent to an image of an object to be captured. As shown in FIG. 1, the finder optical system 30 has a focusing glass 32, a pentaprism 34, and an eyepiece lens 36.

The light from the imaging lens 10, which has been reflected by the main mirror 20, converges near the focusing glass 32. The focusing glass 32 has a mat surface and Fresnel surface with a finder field formed thereon. The focusing glass 32 diffuses object light, and outputs the diffused light to the pentaprism 34. The pentaprism 34 serves as an optical path transforming element which reflects, with a plurality of surfaces, the light diffused by the focusing glass 32, and guides the reflected light to the eyepiece lens 36. The eyepiece lens 36 is also simply called an eyepiece. The eyepiece lens 36 is configured such that the user can observe the finder field formed on the focusing glass 32 through the eyepiece lens 36.

The sub-mirror 40 is arranged downstream of the main mirror 20 along the optical axis OA. The sub-mirror 40 reflects the light (transmitted light) which has been transmitted by the main mirror 20, and guides the reflected light to the focus detection apparatus 100 along an optical axis OA'. The optical axis OA' is deflected from the optical axis OA by the sub-mirror 40. The sub-mirror 40 is configured to be able to be inserted/removed in/from an image capturing optical path (the optical axis OA). The sub-mirror 40 is arranged at a predetermined position on the image capturing optical path (the optical axis OA) in observing the finder, and is removed from the image capturing optical path (the optical axis OA) in capturing an image.

The image sensor 50 has a pixel arrangement with a plurality of regularly arranged pixels. The image sensor 50 converts an image of an object formed on an imaging plane (pixel arrangement) by the imaging lens 10 into an image signal. The image sensor 50 includes, for example, an area (two-dimensional) sensor which performs photoelectric conversion on received light for each pixel, accumulates charges corresponding to the received light amount, and reads out the charges. The image sensor 50 may include, for example, a CMOS image sensor or CCD image sensor. Note that a signal output from the image sensor 50 undergoes predetermined processing in an image processing circuit (not shown) to be image data, and is then converted into image data for recording. After that, the image data for recording is recorded in a recording medium (not shown) such as a semiconductor memory, optical disk, and magnetic tape.

The focus detection apparatus 100 detects the focus state of the imaging lens 10 using a phase difference detection method. In other words, the focus detection apparatus 100 divides light which has passed through the imaging lens 10 and has been reflected by the sub-mirror 40, and detects the focus state of the imaging lens 10 according to the relative positional relationship between a plurality of images formed by the divided light beams. That is, the focus detection apparatus 100 detects the focus state of the imaging lens 10 based on signals obtained by forming a plurality of pairs of images and performing photoelectric conversion on each pair of images.

Figure 2:
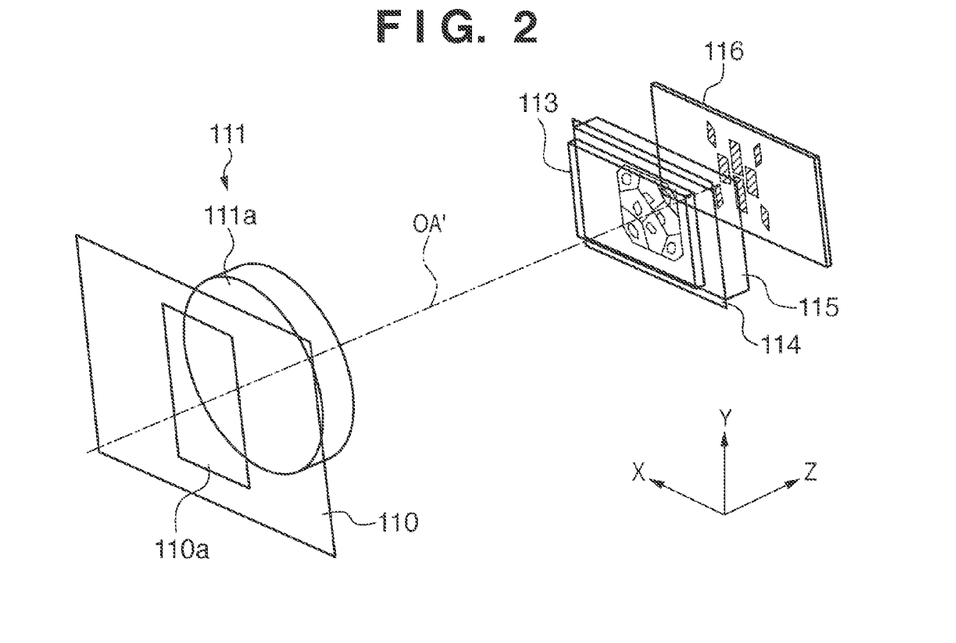
FIG. 2 is a schematic perspective view showing the arrangement of the focus detection apparatus 100 according to the embodiment of the present invention.
Figure 3:
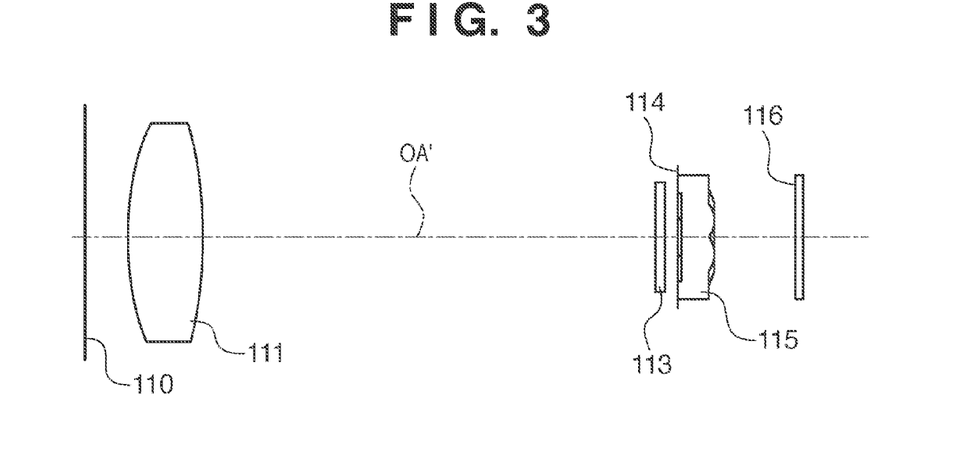
FIG. 3 is a Y-Z sectional view showing the focus detection apparatus 100 according to the embodiment of the present invention.

More specifically, as shown in FIGS. 2 and 3, the focus detection apparatus 100 includes a field mask 110, a field lens 111, a filter 113, a multi-aperture stop 114, a reimaging lens unit (secondary optical system) 115, and a focus detection sensor 116 along the optical axis OA' in the order named.

Figure 4:
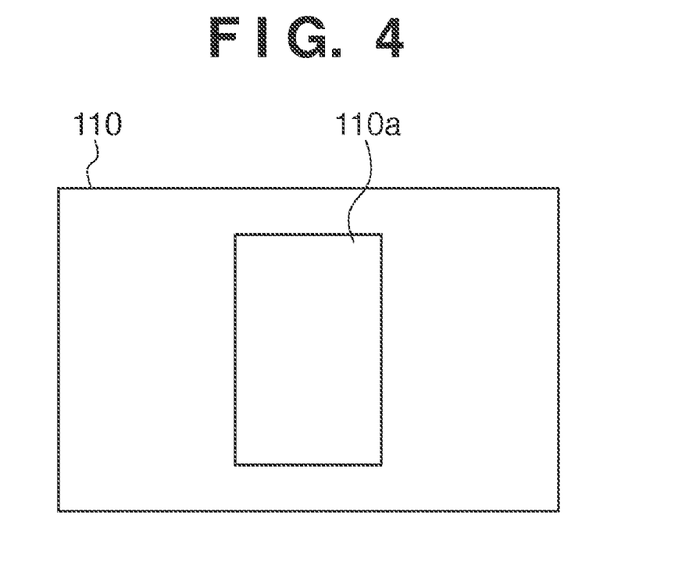
FIG. 4 is a schematic plan view showing a field mask in the focus detection apparatus 100.

As shown in FIG. 4, the field mask 110 has, at its center, a rectangular opening 110a for limiting a light beam which has passed through the imaging lens 10. The field mask 110 is arranged near the expected imaging surface of the imaging lens 10.

The field lens 111 is arranged downstream of the field mask 110 along the optical axis OA'. The field lens 111 includes a lens portion 111a with an optical effect. The lens portion 111a corresponds to the opening 110a of the field mask 110 in the field lens 111.

The filter 113 blocks light having a wavelength longer than that of near infrared light. The filter 113 is adapted for detection of the focus of the imaging lens 10 which has undergone aberration compensation with respect to visible light, and prevents unwanted infrared light from entering the focus detection sensor 116 (to be described later).

Figure 5:
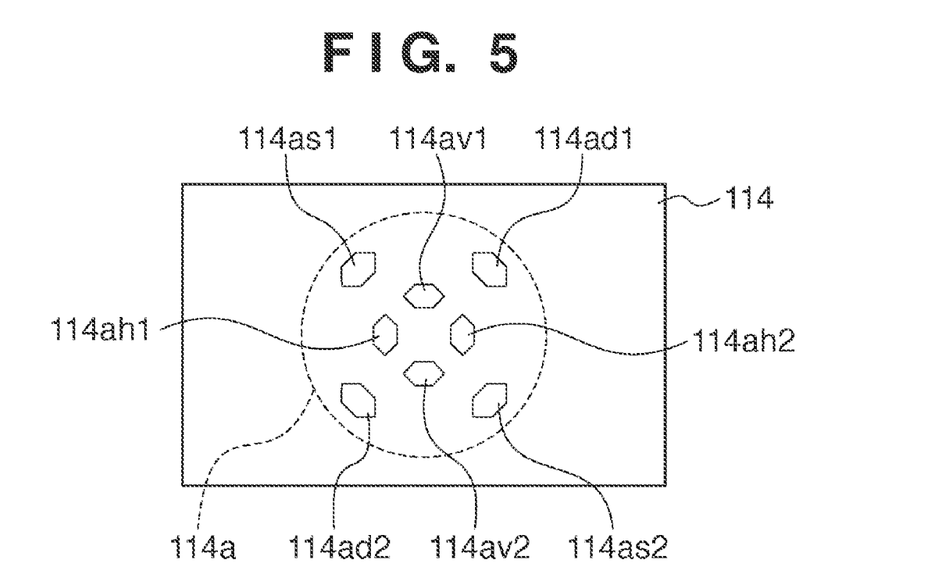
FIG. 5 is a schematic plan view showing a multi-aperture stop in the focus detection apparatus 100.

The multi-aperture stop 114 includes a thin plate, and is arranged downstream of the filter 113 along the optical axis OA' to be adjacent to the filter 113. As shown in FIG. 5, the multi-aperture stop 114 has, at its center, a pair of openings 114av1 and 114av2 aligned in the longitudinal direction (Y direction) of the opening 110a, and a pair of openings 114ah1 and 114ah2 aligned in the shorter side direction (X direction) of the opening 110a. The multi-aperture stop 114 also has, at its center, a pair of openings 114as1 and 114as2 aligned in the 45° left oblique direction, and a pair of openings 114ad1 and 114ad2 aligned in the 45° right oblique direction. Note that an opening 114a collectively represents the openings 114av1, 114av2, 114ah1, 114ah2, 114as1, 114as2, 114ad1, and 114ad2.

The reimaging lens unit 115 includes a first focus detection optical system FD1 and a second focus detection optical system FD2. The first focus detection optical system FD1 divides a light beam limited by the opening 110a of the field mask 110 in at least one of the longitudinal direction (Y direction) of the opening 110a and the shorter side direction (X direction) of the opening 110a. The second focus detection optical system FD2 divides the light beam limited by the opening 110a of the field mask 110 in an oblique direction which intersects the longitudinal direction of the opening 110a within a plane perpendicular to the optical axis of the light beam at an acute angle (for example, 45°). The reimaging lens unit 115 forms, on each element arrangement of a plurality of pairs of element arrangements of the focus detection sensor 116 arranged downstream of the optical axis OA', an image (secondary image) obtained by reimaging an object image on the expected imaging surface, which has been formed by the imaging lens 10. In each element arrangement of each pair of element arrangements, a plurality of focus detection elements are arranged in a predetermined direction, as will be described later. The reimaging lens unit 115 has prism portions and lens portions which correspond to four pairs of openings held by the multi-aperture stop 114. Note that FIG. 6A shows the incident side of the reimaging lens unit and FIG. 6B shows the exit side of the reimaging lens unit.

Figure 6A:
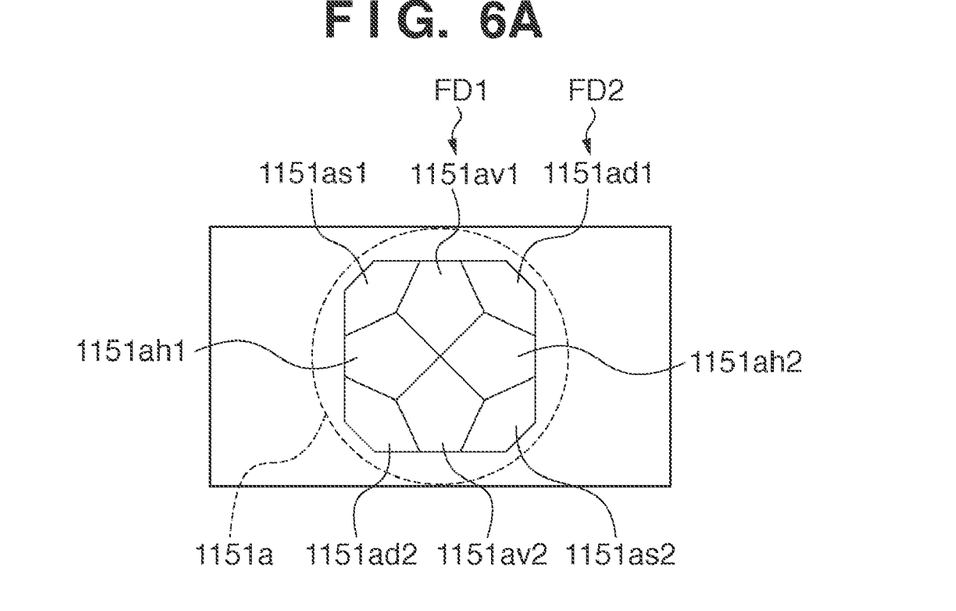
FIGS. 6A and 6B are schematic plan views showing a reimaging lens unit in the focus detection apparatus 100.
Figure 6B:
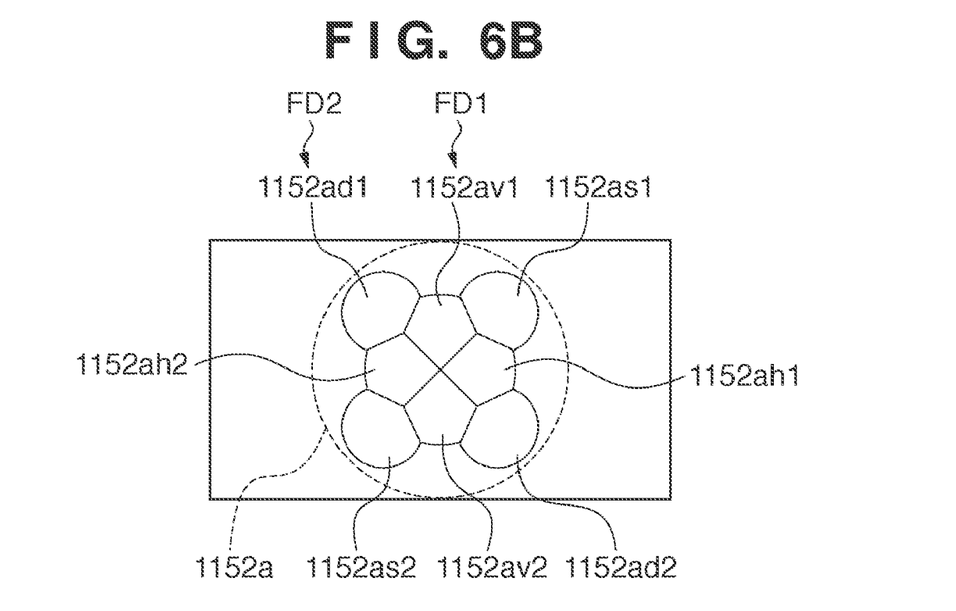

The reimaging lens unit 115 has the prism portions corresponding to the openings of the multi-aperture stop 114 on the incident side, as shown in FIG. 6A. The reimaging lens unit 115 has, at its center, a pair of prism portions 1151av1 and 1151av2 aligned in the longitudinal direction (Y direction) of the opening 110a, and a pair of prism portions 1151ah1 and 1151ah2 aligned in the shorter side direction (X direction) of the opening 110a. The pair of the prism portions 1151av1 and 1151av2 divide the light beam limited by the opening 110a in the longitudinal direction (Y direction) of the opening 110a. The pair of the prism portions 1151ah1 and 1151ah2 divide the light beam limited by the opening 110a in the shorter side direction (X direction) of the opening 110a. That is, the above first focus detection optical system FD1 includes the pair of the prism portions 1151av1 and 1151av2, and the pair of the prism portions 1151ah1 and 1151ah2.

The reimaging lens unit 115 also has, at its center, a pair of prism portion 1151as1 and 1151as2 aligned in the 45° left oblique direction, and a pair of prism portions 1151ad1 and 1151ad2 aligned in the 45° right oblique direction. The 45° left oblique direction (oblique direction) is obtained by rotating the longitudinal direction of the opening 110a counterclockwise by 45° when viewed from upstream to downstream of the optical axis OA'. The 45° right oblique direction (the second oblique direction) is obtained by rotating the longitudinal direction of the opening 110a clockwise by 45° when viewed from upstream to downstream of the optical axis OA', and is perpendicular to the 45° left oblique direction within a plane normal to the optical axis OA'. The pair of the prism portions 1151as1 and 1151as2 divide the light beam limited by the opening 110a in the 45° left oblique direction. The pair of the prism portions 1151ad1 and 1151ad2 divide the light beam limited by the opening 110a in the 45° right oblique direction. That is, the above second focus detection optical system FD2 includes the pair of the prism portions 1151as1 and 1151as2, and the pair of the prism portions 1151ad1 and 1151ad2.

A prism portion 1151a collectively represents the prism portions 1151av1, 1151av2, 1151ah1, 1151ah2, 1151as1, 1151as2, 1151ad1, and 1151ad2.

As shown in FIG. 6B, the reimaging lens unit 115 has the lens portions corresponding to the above-described prism portions on the exit side. Note that each lens portion has a spherical surface. The reimaging lens unit 115 has, at its center, a pair of lens portions 1152av1 and 1152av2 aligned in the longitudinal direction (Y direction) of the opening 110a, and a pair of lens portions 1152ah1 and 1152ah2 aligned in the shorter side direction (X direction) of the opening 110a. The pair of the lens portions 1152av1 and 1152av2 guide the light beams divided in the longitudinal direction (Y direction) of the opening 110a to the focus detection sensor 116. The pair of lens portions 1152ah1 and 1152ah2 guide the light beams divided in the shorter side direction (X direction) of the opening 110a to the focus detection sensor 116. That is, the above first focus detection optical system FD1 includes the pair of the lens portions 1152av1 and 1152av2, and the pair of the lens portions 1152ah1 and 1152ah2.

The reimaging lens unit 115 also has, at its center, a pair of lens portions 1152as1 and 1152as2 aligned in the 45° left oblique direction, and a pair of lens portions 1152ad1 and 1152ad2 aligned in the 45° right oblique direction. The pair of the lens portions 1152as1 and 1152as2 guide the light beams divided in the 45° left oblique direction to the focus detection sensor 116. The pair of the lens portions 1152ad1 and 1152ad2 guide the light beams divided in the 45° right oblique direction to the focus detection sensor 116. That is, the above second focus detection optical system FD2 includes the pair of the lens portions 1152as1 and 1152as2, and the pair of the lens portions 1152ad1 and 1152ad2.

Since FIG. 6A shows the incident side of the reimaging lens unit 115 and FIG. 6B shows the exit side of the reimaging lens unit 115, the above-described lens portions are shown by reversing the left and right. A lens portion 1152a collectively represents the lens portions 1152av1, 1152av2, 1152ah1, 1152ah2, 1152as1, 1152as2, 1152ad1, and 1152ad2.

Next, the focus detection operation of the focus detection apparatus 100 will be explained. Note that subscripts 1 and 2 of the reference numerals in FIGS. 6A and 6B indicate elements for forming a pair of object images in the focus detection apparatus using the phase difference detection method.

The light beam which has passed through the opening 110a of the field mask 110 (the light beams limited by the opening 110a) passes through the lens portion 111a of the field lens 111, and then enters the multi-aperture stop 114 via the filter 113. The opening 114a of the multi-aperture stop 114 is configured to undergo back projection near the exit pupil of the imaging lens 10 using the lens portion 111a of the field lens 111. Part of the light beam which has entered the opening 110a of the field mask 110 surely reaches the opening 114a of the multi-aperture stop 114.

The openings 114av1, 114av2, 114ah1, and 114ah1 of the multi-aperture stop 114 are arranged so as to be inscribed in substantially the same circle. The openings 114as1, 114as2, 114ad1, and 114ad2 of the multi-aperture stop 114 are arranged so as to be inscribed in substantially the same circle which has the same center as that of the above-mentioned inscribed circle, and a diameter larger than that of the inscribed circle. With this arrangement, a light beam of the imaging lens 10 with higher brightness (a smaller F-number) reaches the openings 114*as*1, 114*as*2, 114*ad*1, and 114*ad*2, as compared with the other openings 114*av*1, 114*av*2, 114*ah*1, and 114*ah*1.

The light beam which has passed through the opening 110*a* of the field mask 110 (the light beam limited by the opening 110*a*) is guided to each prism portion and lens portion of the reimaging lens unit 115 arranged downstream of the multi-aperture stop 114 along the optical axis OA'. The opening 110*a* of the field mask 110 is provided for a focus detection optical system having the lens portion 111*a* of the field lens 111, the opening 114*a* of the multi-aperture stop 114, and the prism portion 1151*a* and the lens portion 1152*a* of the reimaging lens unit 115.

The light beam which has exited from the reimaging lens unit 115 enters the focus detection sensor 116 located downstream of the optical axis OA'. Four pairs of secondary images (that is, eight images) obtained by using the opening 110*a* of the field mask 110 as an object image (optical image) are formed on the focus detection sensor 116.

Figure 7A:
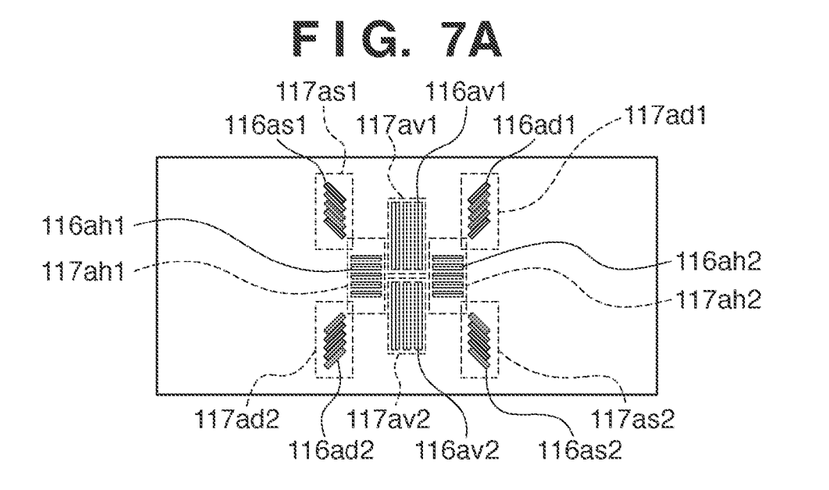
FIGS. 7A to 7E are schematic plan views showing a focus detection sensor in the focus detection apparatus 100.

FIG. 7A is a schematic plan view showing the focus detection sensor 116 on which object images have been formed. Referring to FIG. 7A, reference numerals 117*av*1 to 117*ad*2 denote optical images which are formed by the opening 110*a* of the field mask 110 when the imaging lens 10 is in focus. Two optical images are formed for each opening of the field mask 110 by the action of each pair of openings (with subscripts 1 and 2 in FIG. 5) of the multi-aperture stop 114, and the action of each pair of prism portions (with subscripts 1 and 2 in FIG. 6A) and each pair of lens portions (with subscripts 1 and 2 in FIG. 6B) of the reimaging lens unit 115.

A pair of light beams which have been divided in the longitudinal direction (Y direction) of the opening 110*a* by the first focus detection optical system FD1 form a pair of optical images 117*av*1 and 117*av*2. A pair of light beams which have been divided in the shorter side direction (X direction) of the opening 110*a* by the first focus detection optical system FD1 form a pair of optical images 117*ah*1 and 117*ah*2. A pair of light beams which have been divided in the 45° left oblique direction by the second focus detection optical system FD2 form a pair of optical images 116*as*1 and 116*as*2. A pair of light beams which have been divided in 45° right oblique direction by the second focus detection optical system FD2 form a pair of optical images 116*ad*1 and 116*ad*2.

A pair of element arrangements 116*av*1 and 116*av*2 are arranged within the pair of the optical images 117*av*1 and 117*av*2, respectively. In the pair of the element arrangements 116*av*1 and 116*av*2, six pairs of focus detection elements 116*av*1-1 to 116*av*1-6 and 116*av*2-1 to 116*av*2-6 respectively extend in the longitudinal direction of the opening 110*a*. Note that focus detection elements having the same number after a hyphen are paired. In each of the pair of the element arrangements 116*av*1 and 116*av*2, a plurality of focus detection elements are aligned in the shorter side direction of the opening 110*a*. This makes it possible to define a plurality of third focus detection areas 115*av*-1 to 115*av*-6 (see FIG. 8A), which are aligned in the shorter side direction of the opening 110*a* within a frame on the expected imaging surface of the imaging lens 10, and respectively extend in the longitudinal direction of the opening 110*a*.

Similarly, a pair of element arrangements 116*ah*1 and 116*ah*2 are aligned within the pair of the optical images 117*ah*1 and 117*ah*2, respectively. In the pair of the element arrangements 116*ah*1 and 116*ah*2, 10 pairs of focus detection elements 116*ah*1-1 to 116*ah*1-10 and 116*ah*2-1 to 116*ah*2-10 respectively extend in the shorter side direction of the opening 110*a*. Note that focus detection elements having the same number after a hyphen are paired. In each of the pair of the element arrangements 116*ah*1 and 116*ah*2, a plurality of focus detection elements are aligned in the longitudinal direction of the opening 110*a*. This makes it possible to define a plurality of fourth focus detection areas 115*ah*-1 to 115*ah*-10 (see FIG. 8A) which are aligned in the longitudinal direction of the opening 110*a* within the frame on the expected imaging surface of the imaging lens 10, and respectively extend in the shorter side direction of the opening 110*a*.

Figure 7B:
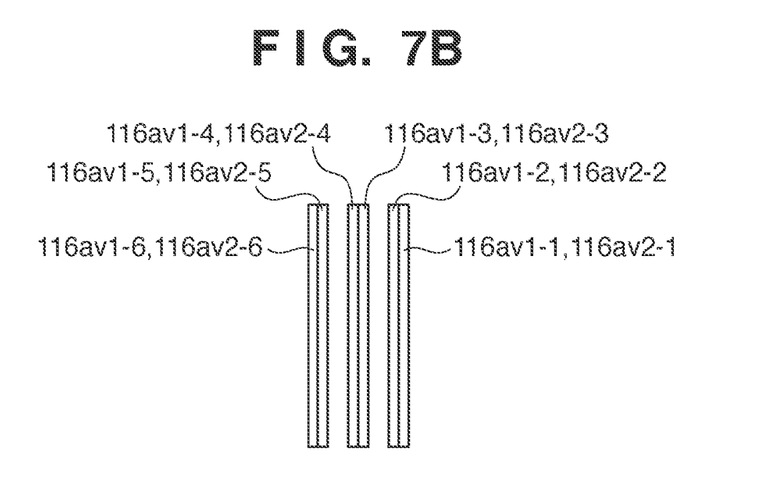
Figure 7C:
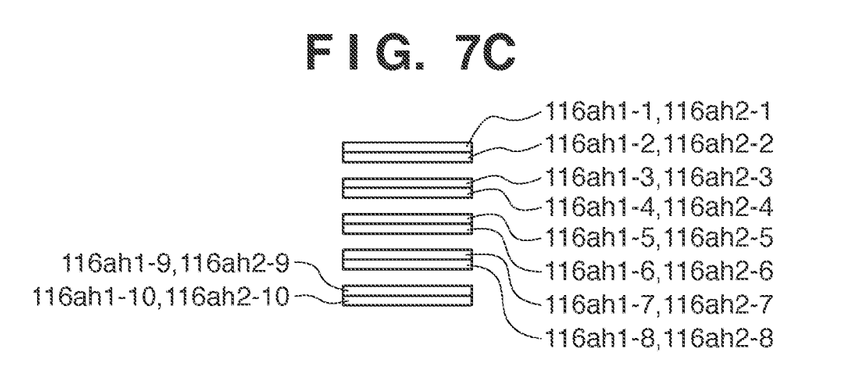

That is, the focus detection sensor 116 includes the plurality of first focus detection elements 116*av*1-1 to 116*av*1-6, 116*av*2-1 to 116*av*2-6, 116*ah*1-1 to 116*ah*1-10, and 116*ah*2-1 to 116*ah*2-10 shown in FIGS. 7B and 7C. The plurality of first focus detection elements receive the light beams divided by the first focus detection optical system FD1. Each of the first focus detection elements generates a signal (charge) for focus detection by performing photoelectric conversion on the received light. Each of the first focus detection elements is, for example, a photodiode. The plurality of first focus detection elements define a plurality of first focus detection regions which respectively extend in the dividing direction by the first focus detection optical system FD1 within the frame on the expected imaging surface of the imaging lens, and are aligned at a predetermined interval. The plurality of first focus detection regions include a plurality of third focus detection areas 115*av*-1 to 115*av*-6 and a plurality of fourth focus detection areas 115*ah*-1 to 115*ah*-10 (see FIG. 8A). This makes it possible to define, on the expected imaging surface of the imaging lens 10, a plurality of focus detection regions (focus detection areas) which extend in a nearly checkerboard pattern. As a result, it becomes easy to improve the processing accuracy of focus detection independently of (the direction of) the spatial pattern of an object.

Likewise, a pair of element arrangements 116*as*1 and 116*as*2 are arranged within the pair of the optical images 117*as*1 and 117*as*2, respectively. In the pair of the element arrangements 116*as*1 and 116*as*2, 10 pairs of focus detection elements 116*as*1-1 to 116*as*1-10 and 116*as*2-1 to 116*as*2-10 respectively extend in the 45° left oblique direction. Note that focus detection elements having the same number after a hyphen are paired. In each of the pair of the element arrangements 116*as*1 and 116*as*2, a plurality of focus detection elements are aligned in the longitudinal direction of the opening 110*a*. This makes it possible to define a plurality of first focus detection areas 115*as*-1 to 115*as*-10 (see FIG. 8B) which are aligned in the longitudinal direction of the opening 110*a* within the frame on the expected imaging surface of the imaging lens 10, and respectively extend in the 45° left oblique direction.

A pair of element arrangements 116*ad*1 and 116*ad*2 are arranged within the pair of the optical images 117*ad*1 and 117*ad*2, respectively. In the pair of the element arrangements 116*ad*1 and 116*ad*2, 10 pairs of focus detection elements 116*ad*1-1 to 116*ad*1-10 and 116*ad*2-1 to 116*ad*2-10 respectively extend in the 45° right oblique direction. Note that focus detection elements having the same number after a hyphen are paired. In each of the pair of the element arrangements 116*ad*1 and 116*ad*2, a plurality of focus detection elements are aligned in the longitudinal direction of the opening 110*a*. This makes it possible to define a plurality of second focus detection areas 115*ad*-1 to 115*ad*-10 (see FIG. 8B) which are aligned in the longitudinal direction of the opening 110a within the frame on the expected imaging surface of the imaging lens 10, and respectively extend in the 45° right oblique direction.

Figure 7D:
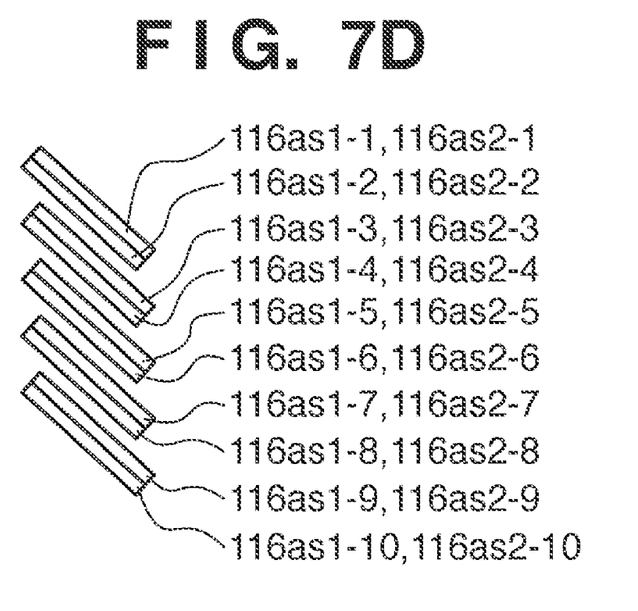
Figure 7E:
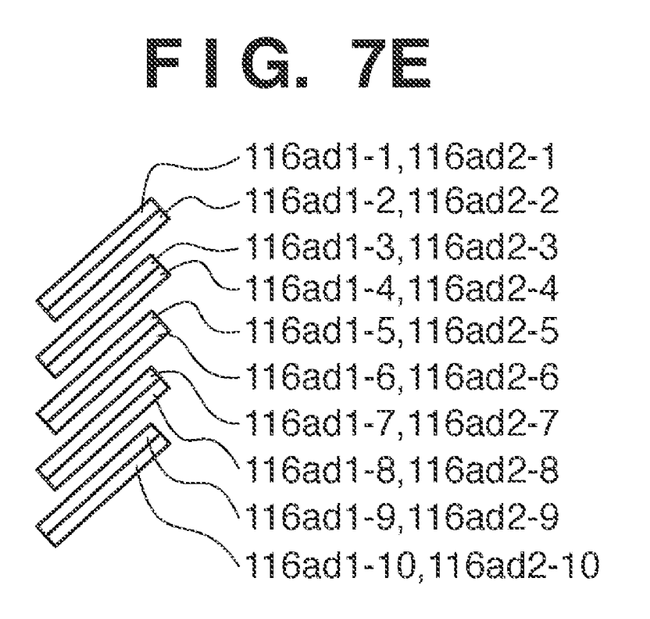

That is, the focus detection sensor 116 includes the plurality of second focus detection elements 116as1-1 to 116as1-10, 116as2-1 to 116as2-10, 116ad1-1 to 116ad1-10, and 116ad2-1 to 116ad2-10 shown in FIGS. 7D and 7E. The plurality of second focus detection elements receive the light beams divided by the second focus detection optical system FD2. Each of the second focus detection elements generates a signal (charge) for focus detection by performing photoelectric conversion on the received light. Each of the second focus detection elements is, for example, a photodiode. The plurality of second focus detection elements define a plurality of second focus detection regions which respectively extend in the dividing direction by the second focus detection optical system FD2 within the frame on the expected imaging surface of the imaging lens. The plurality of second focus detection regions include the plurality of first focus detection areas 115as-1 to 115as-10 and the plurality of second focus detection areas 115ad-1 to 115ad-10 (see FIG. 8B). This makes it possible to define a plurality of focus detection regions (focus detection areas) which extend in the 45° left and right oblique directions that intersect with each other, and are aligned in the longitudinal direction of the opening 110a. By using the focus detection regions in combination with the above plurality of focus detection regions extending in a nearly grid shape, it becomes easier to improve the processing accuracy of focus detection independently of (the direction of) the spatial pattern of an object.

Each of the first and second focus detection elements may include an accumulation-type photoelectric conversion element. Each of the first and second focus detection elements extends almost linearly, as shown in FIGS. 7B to 7E. However, it may extend in a shape according to optical image distortion in order to correct distortion of a focus detection optical system. Furthermore, a pair of focus detection elements need not be arranged separately, and a linear array of focus detection elements may be used and divided into a plurality of groups in processing a signal.

In the focus detection apparatus 100, with a change in position in the optical axis direction of an actual object image with respect to the expected imaging surface, optical images on the focus detection sensor 116 of an object within an optical image of the field mask 110 move closer to or away from each other. If, for example, the imaging lens 10 images light beams upstream of the expected imaging surface along the optical axis OA', the pair of optical images formed on the focus detection sensor 116 move closer to one another. Alternatively, if the imaging lens 10 images light beams downstream of the expected imaging surface along the optical axis OA', the pair of optical images formed on the focus detection sensor 116 move in the opposite directions, that is, away from one another. In this case, by arranging a plurality of focus detection elements in a direction in which the optical images move, the movement of the optical images is detected. Based on a detection result (an output from the focus detection sensor 116), a known correlation calculation means calculates a relative position interval between the light amount distributions of the optical images.

If it is possible to calculate a change amount of the interval of a pair of optical images, it is also possible to obtain the defocus amount of the imaging lens 10 by approximating the relationship between the change amount and the defocus amount of the imaging lens 10 using a polynomial having the change amount as a variable, or the like. This allows to detect the focus (focus state) of the imaging lens 10. In other words, calculating the interval of a pair of optical images enables to detect the focus (focus state) of the imaging lens 10 with respect to a plurality of focus detection regions defined as back projection images on the expected imaging surfaces of a plurality of focus detection elements.

Since the pair of the element arrangements 116av1 and 116av2 are aligned in the longitudinal direction of the opening 110a, they are suitable for focus detection of an object having a contrast component in the longitudinal direction of the opening 110a. On the other hand, since the pair of the element arrangements 116ah1 and 116ah2 are aligned in the shorter side direction of the opening 110a, they are suitable for focus detection of an object having a contrast component in the shorter side direction of the opening 110a. Combining the above element arrangements allows so-called cross-type focus detection. This makes a focus detection result less susceptible to a direction in which the object has a contrast component. As a result, it becomes easy to perform highly accurate focus detection.

In this embodiment, as described above, light beams which have passed through the openings 114av1, 114av2, 114ah1, and 114ah2 of the multi-aperture stop 114 reach the element arrangements 116av1, 116av2, 116ah1, and 116ah2. As compared with focus detection using light beams which have passed through the other openings of the multi-aperture stop 114, the brightness (F-number) of the imaging lens 10 has a smaller adverse effect, and a relatively large number of imaging lens can execute focus detection.

Since the pair of the element arrangements 116as1 and 116as2 are aligned in the 45° left oblique direction, they are suitable for focus detection of an object having a contrast component in the 45° left oblique direction. On the other hand, since the pair of the element arrangements 116ad1 and 116ad2 are aligned in the 45° right oblique direction, they are suitable for focus detection of an object having a contrast component in the 45° right oblique direction. Performing cross-type focus detection in an oblique direction in addition to the above-described cross-type focus detection makes a focus detection result less susceptible to a direction in which the object has a contrast component. As a result, it becomes easier to perform highly accurate focus detection.

In this embodiment, as described above, light beams which have passed through the openings 114as1, 114as2, 114ad1, and 114ad2 of the multi-aperture stop 114 reach the element arrangements 116as1, 116as2, 116ad1, and 116ad2. As compared with focus detection using light beams which have passed through the other openings of the multi-aperture stop 114, the imaging lens 10 needs to have higher brightness (a smaller F-number). However, since a change amount of the interval of a pair of optical images is large with respect to a defocus amount, it is possible to perform focus detection with higher accuracy.

Figure 8A:
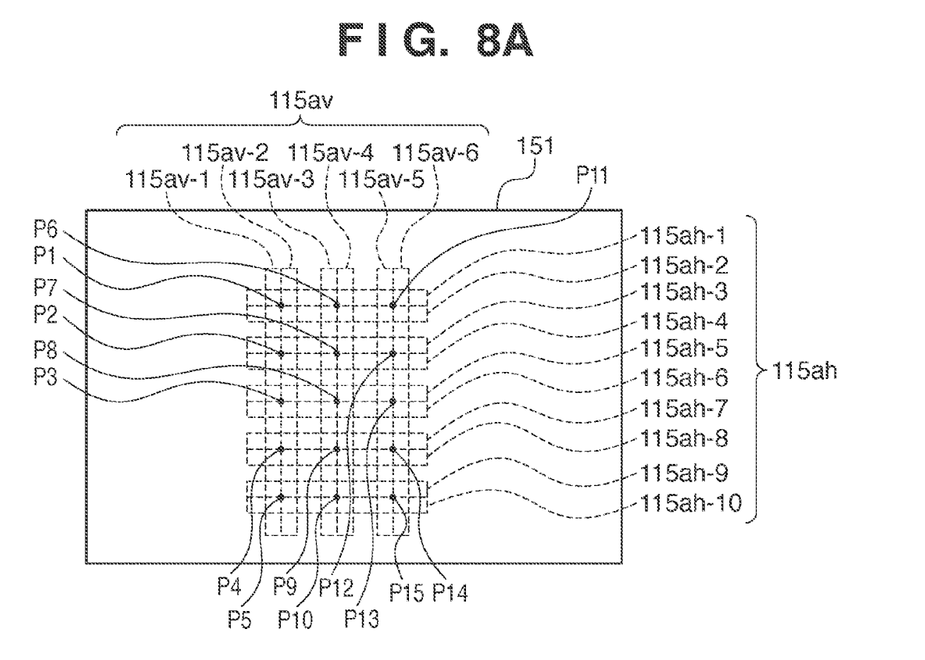
FIGS. 8A and 8B are views for explaining focus detection regions in a finder field.
Figure 8B:
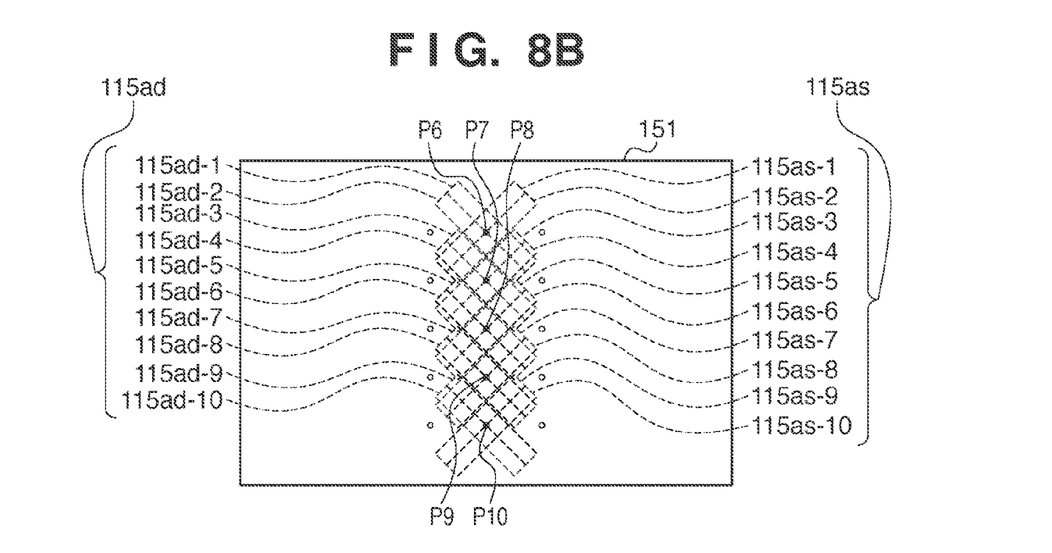

Referring to FIGS. 8A and 8B, focus detection regions in the finder field will be explained. FIG. 8A shows the relationship between the focus detection regions and the finder field when observing the surface of the focusing glass 32 of the image capturing apparatus 1 via the pentaprism 34 and the eyepiece lens 36. The focusing glass 32 is arranged near the expected imaging surface of the imaging lens 10, and can thus be considered as an expected imaging surface.

Referring to FIGS. 8A and 8B, reference numeral 151 denotes a finder field as an erect image within an image capturing range. The finder field roughly corresponds to the image capturing range. The image capturing range corresponds to a frame in the attached claims. The image capturing apparatus is generally configured so that the finder field has an almost rectangular shape whose long sides are parallel to the shorter side direction of the opening 110a and whose short sides are parallel to the longitudinal direction of the opening 110a. If a pair of element arrangements in the focus detection sensor 116 undergo to back projection on the expected imaging surface of the imaging lens 10, their back projection images nearly coincide with other.

FIG. 8A shows the finder field including a plurality of first focus detection regions which extend in the longitudinal and shorter side directions of the opening 110a. In the finder field 151, reference numerals 115av-1 to 115ah-10 denote a plurality of first focus detection regions which are defined as back projection images corresponding to the two pairs of the element arrangements (116av1, 116av2, 116ah1, and 116ah2) of the focus detection sensor 116. Since the focus detection regions 115av-1 to 115ah-10 are defined as back projection images of the focus detection elements on the focus detection sensor 116, it is possible to detect the light amount distribution of an object having a shape extending in the longitudinal or shorter side direction of the opening 110a.

Note that a focus detection region group 115av collectively represents the focus detection regions 115av1 to 115av6. A focus detection region group 115ah collectively indicates the focus detection regions 115ah1 to 115ah10.

In this embodiment, by paring two focus detection regions, the defocus amount of the focus detection regions is calculated. In this case, it is possible to perform a more highly accurate focus detection by shifting each of the two focus detection regions by half the pixel pitch of an element arrangement, that is, shifting the two focus detection regions to have a staggered arrangement, and calculating the interval of optical images based on the light amount distributions of an object obtained from the two focus detection regions.

The subscripts av to ah given to the focus detection regions correspond to those given to the element arrangements of the focus detection sensor 116 shown in FIGS. 7A to 7E. For example, the focus detection region 115av-1 is defined by back projection of the focus detection element 116av1-1.

In the finder field 151, the intersection of a pair of focus detection regions extending in the shorter side direction (represented by the subscript h) of the opening 110a and a pair of focus detection regions extending in the longitudinal direction (represented by the subscript v) of the opening 110a is defined as a focus detection point. As shown in FIG. 8A, reference symbols P1 to P15 denote focus detection points. A defocus amount at each focus detection point is calculated based on the light amount distributions of an object in the longitudinal and shorter side directions of the opening 110a. In other words, the focus detection points P1 to P15 serve as a plurality of intersections in cross-shaped focus detection regions. That is, the focus detection points P1 to P15 serve as a plurality of intersections of a plurality of third focus detection areas extending in the longitudinal direction of the opening 110a and a plurality of fourth focus detection area extending in the shorter side direction of the opening 110a.

In this embodiment, the cross-shaped focus detection regions in the longitudinal and shorter side directions of the opening 110a have a total of 15 focus detection points in five rows and three columns in the center of the finder field 151. It is, thus, possible to perform focus detection of an object corresponding to the focus detection regions. To perform focus detection at each focus detection point, a defocus amount is calculated using at least part of a corresponding focus detection region (focus detection area). That is, the interval of optical images is calculated by cutting and using at least part of an output from each element arrangement.

FIG. 8B shows the finder field including a plurality of second focus detection regions extending in the 45° left and right oblique directions. In the finder field 151, reference numerals 115as-1 to 115ad-10 denote a plurality of second focus detection regions which are defined as back projection images corresponding to the two pairs of the element arrangements (116as1, 116as2, 116ad1, 116ad2) of the focus detection sensor 116. Since the focus detection regions 115as-1 to 115ad-10 are defined as back projection images of the focus detection elements in the focus detection sensor 116, it is possible to detect the light amount distribution of an object having a shape extending in the 45° left or right oblique direction.

Note that a focus detection region group 115 as collectively represents the focus detection regions 115as1 to 115as10. A focus detection region group 115ad collectively indicates the focus detection regions 115ad1 to 115ad10.

In this embodiment, by paring two focus detection regions, the defocus amount of the focus detection regions is calculated.

The subscripts as to ad given to the focus detection regions correspond to those given to the element arrangements of the focus detection sensor 116 shown in FIGS. 7A to 7E. For example, the focus detection region 115as-1 is defined by back projection of the element arrangement 116as1-1.

In the finder field 151, the intersection of a pair of focus detection regions extending in the 45° right oblique direction (represented by the subscript s) and a pair of focus detection regions extending in the 45° left oblique direction (represented by the subscript d) is arranged so as to coincide with corresponding one of the focus detection points P6 to P10. That is, the plurality of intersections P1 to P15 of the plurality of third focus detection areas and the plurality of fourth focus detection areas include the plurality of intersections P6 to P10 of the plurality of first focus detection areas and the plurality of second focus detection areas. A defocus amount at each focus detection point is calculated based on the light amount distributions of an object in the 45° right and left oblique directions. In other words, the focus detection points P6 to P10 serve as a plurality of intersections in cross-shaped focus detection regions in the 45° right and left oblique directions. The plurality of focus detection points P6 to P10 are aligned in the longitudinal direction of the opening 110a within the frame.

In this embodiment, the cross-shaped focus detection regions in the 45° right and left oblique directions have a total of five focus detection points in five rows and one column in the center of the finder field 151. It is, thus, possible to perform focus detection of an object corresponding to the focus detection regions. To perform focus detection at each focus detection point, a defocus amount is calculated using at least part of a corresponding focus detection region (focus detection area). That is, the interval of optical images is calculated by cutting and using at least part of an output from each element arrangement.

In consideration of composition in capturing an image, it is necessary for the focus detection apparatus to have, in a wide range, a plurality of focus detection regions at positions where an object may be located at a high probability. It is also necessary for a focus detection region corresponding to each focus detection point to extend in more directions, and to acquire a light amount distribution irrespective of the direction of an object.

To satisfy these requirements, it is possible to make the frame larger by widening the opening 110a of the field mask 110 shown in FIG. 2 as much as possible, and thus to arrange the focus detection regions in a wider range. Within the image capturing range (the finder field 151), however, as the opening of the finder field is widened, it becomes impossible to detect a focus since the optical images 117av1 to 117ad2 on the focus detection sensor 116 overlap with each other. It is possible to avoid this problem by providing an opening of the field mask in addition to the opening 110a, and arranging it so as to have, as the center, a position as far away as possible from the intersection with the optical axis OA'. When light beams which have passed through the provided opening pass through an additionally provided subsequent focus detection optical system, it is possible to arrange the focus detection regions in a wider range. Alternatively, to avoid optical images from overlapping each other, the optical path of the focus detection optical system may be extended. With this method, however, downsizing is difficult in consideration of arranging a focus detection apparatus within an image capturing apparatus.

The size (dimensions) of the opening 110a of the field mask 110 is limited. In this embodiment, under such limitation, the above requirements are satisfied by more densely arranging focus detection regions extending in more directions within the frame, as described above.

Figure 9A:
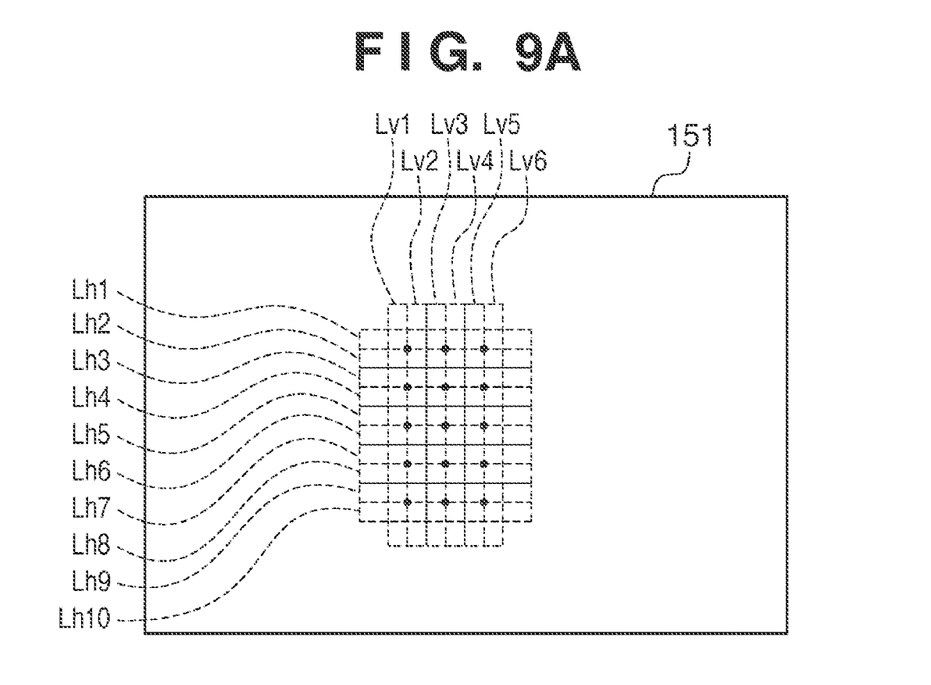
FIGS. 9A and 9B are views for explaining focus detection regions in the finder field.
Figure 9B:
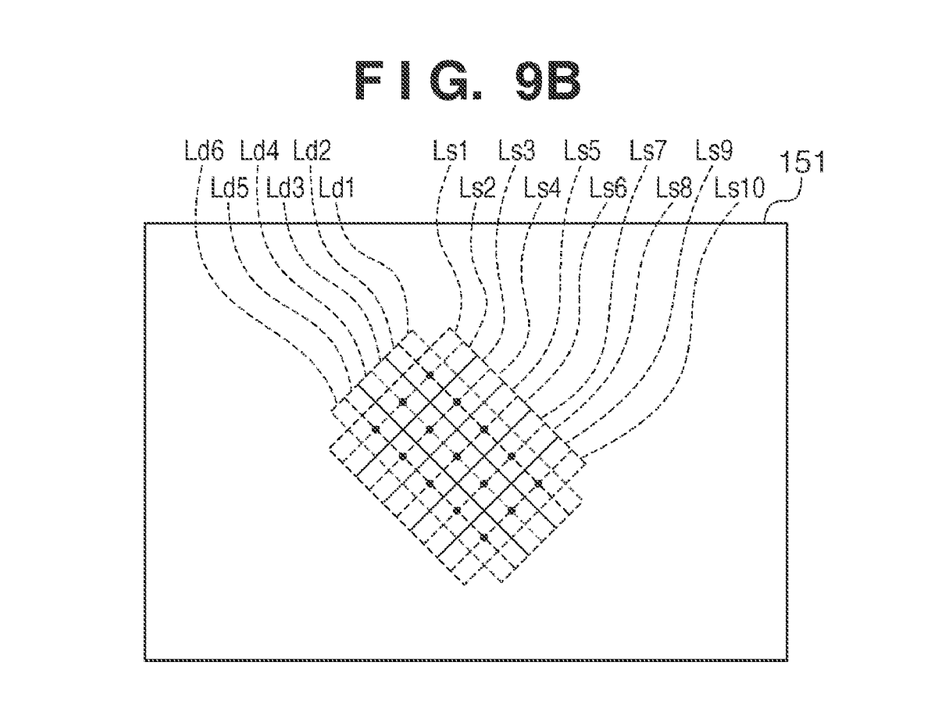

Another arrangement of the plurality of first focus detection regions according to this embodiment will now be explained. FIGS. 9A and 9B show an example in which cross-shaped focus detection regions are more densely arranged in the finder field 151. FIG. 9A shows the arrangement of the cross-shaped focus detection regions in the longitudinal and shorter side directions of the opening 110a. FIG. 9B shows the arrangement of the cross-shaped focus detection regions in the 45° left and right oblique directions.

Referring to FIG. 9A, the focus detection regions are densely arranged by respectively juxtaposing a plurality of first focus detection regions extending in the longitudinal and shorter side directions of the opening 110a in directions perpendicular to the respective extending directions without any gap. Reference symbols Lv1 to Lv6 denote focus detection areas (third focus detection areas) extending in the longitudinal direction of the opening 110a; and Lh1 to Lh10, focus detection areas (fourth focus detection areas) extending in the shorter side direction of the opening 110a. Each focus detection region (each focus detection area) is defined as the back projection image of a focus detection element, as described above. The intersection of a pair of focus detection regions extending in the shorter side direction (represented by the subscript h) of the opening 110a of the finder field 151 and a pair of focus detection regions extending in the longitudinal direction (represented by the subscript v) of the opening 110a is defined as a focus detection point, as described with reference to FIGS. 8A and 8B. In this case, it is possible to arrange a total of 15 focus detection points (black points in FIG. 9A) in a two-dimensional manner (in a matrix topology). A case in which the 15 focus detection points are arranged has been shown in this example. It is, however, possible to arrange more or less focus detection points in the cross-shaped focus detection regions in the longitudinal and shorter side directions of the opening 110a in the same manner.

Referring to FIG. 9B, the focus detection regions are densely arranged by respectively juxtaposing a plurality of first focus detection regions extending in the 45° right and left oblique directions in directions perpendicular to the respective extending directions without any gap. Reference symbols Ld1 to Ld6 denote focus detection areas extending in the 45° left oblique direction; and Ls1 to Ls10, focus detection areas extending in the 45° right oblique direction. Each focus detection region (each focus detection area) is defined as the back projection image of a focus detection element, as described above. The intersection of a pair of focus detection regions extending in the 45° left oblique direction (represented by the subscript d) of the finder field 151 and a pair of focus detection regions extending in the 45° right oblique direction (represented by the subscript s) is defined as a focus detection point, as described with reference to FIGS. 8A and 8B. In this case, it is possible to arrange a total of 15 focus detection points (black points in FIG. 9B) in a 45° oblique rectangle. A case in which the 15 focus detection points are arranged has been shown in this example. It is, however, possible to arrange more or less focus detection points in the cross-shaped focus detection regions in the 45° right and left oblique directions in the same manner.

In general, to select a focus detection point, the user uses a 4-way selector or the like. In consideration of this, it is easier to select a focus detection point if focus detection regions are aligned in the longitudinal and shorter side directions of the opening 110a as shown in FIG. 9A, than if focus detection regions are alternately aligned in oblique directions as shown in FIG. 9B. The focus detection regions are used to acquire the light amount distribution of an object and calculate a defocus amount. At this time, many general objects such as people and buildings have a remarkable light amount distribution, that is, a high contrast in the vertical or horizontal direction. As described above, in consideration of arranging focus detection regions in a wider range within the image capturing range, the shape of the opening 110a of the field mask 110 can roughly be formed by straight lines in the vertical and horizontal directions. The image capturing range is generally a rectangle formed by straight lines in the horizontal and vertical directions. Therefore, when the shape of the opening of the field mask is also formed by straight lines in the vertical and horizontal directions, it is possible to more densely arrange focus detection regions without wasting space. If the first focus detection regions are arranged as shown in FIG. 9B, the opening of the field mask is a 45° oblique rectangle. In this case, when providing another opening of the field mask, an efficient arrangement is difficult to implement.

From the above viewpoint, the cross-shaped focus detection regions (the plurality of first focus detection regions) are preferably arranged in the longitudinal and shorter side directions of the opening 110a. In this embodiment, as described with reference to FIG. 8B, the intersections of the oblique cross-shaped focus detection regions (the plurality of second focus detection regions) are aligned in the longitudinal direction of the opening 110a to overlap with the points P6 to P10. This makes it possible to efficiently arrange the oblique focus detection regions within the range of the focus detection regions in the longitudinal and shorter side directions of the opening 110a. This enables to arrange focus detection points at high density in a wide range of the focus detection regions, thereby simultaneously implementing detection of the light amount distribution of an object in more directions.

Figure 10:
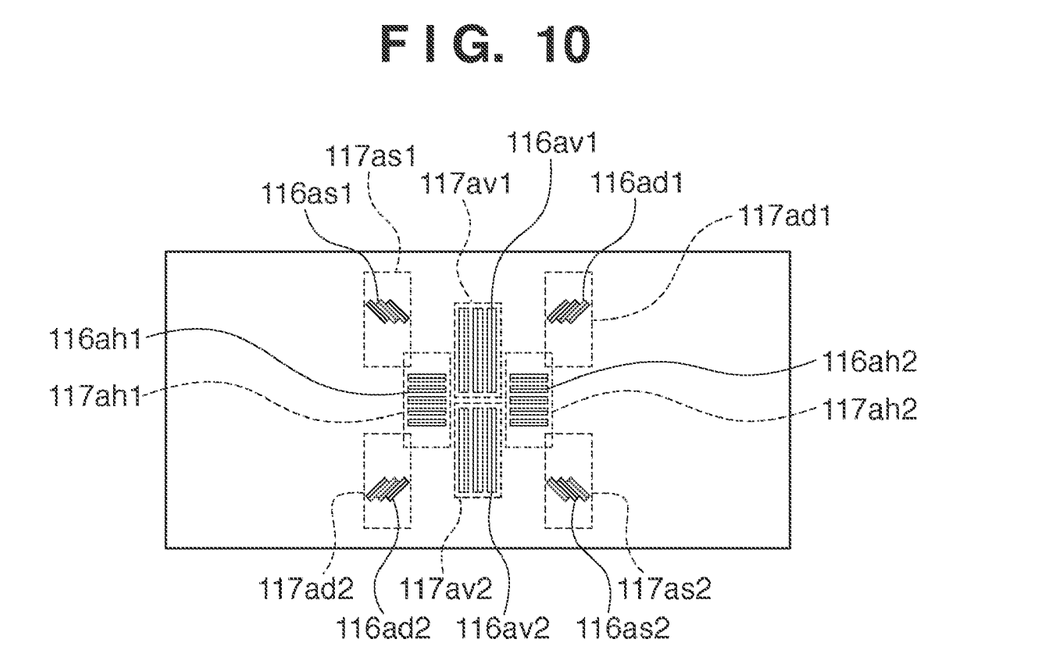
FIG. 10 is a schematic plan view showing a focus detection sensor in the focus detection apparatus 100.

Although in this embodiment, a focus detection region coincides with the back projection image of a focus detection element, a focus detection region may be part of the back projection image of a focus detection element. More specifically, although oblique cross-shaped focus detection regions are aligned in the longitudinal direction of the opening 110a since the opening of the field mask is vertically oriented in general, the back projection images of focus detection elements are not limited to this. The back projection images may be arranged within a rectangle formed by 45° oblique sides, and some of them may be used as focus detection regions. As shown in FIG. 10, for example, oblique fields may be aligned in the shorter side direction.

In this embodiment, the imaging lens 10 is configured to deal with brighter light beams (with a smaller F-number) in the second focus detection optical system whose light dividing directions are the 45° oblique directions, as compared with the first focus detection optical system whose light dividing directions are the longitudinal and shorter side directions of the opening 110a. With this configuration, the plurality of first focus detection elements perform focus detection using light beams with an F-number equal to or smaller than the first F-number of the imaging lens 10. On the other hand, the plurality of second focus detection elements perform focus detection using light beams with an F-number equal to or smaller than the second F-number of the imaging lens 10, which is smaller than the first F-number. This allows more lenses to execute cross-type focus detection in the longitudinal and shorter side directions of the opening 110a. When the imaging lens 10 has higher brightness (a smaller F-number) and light beams have a shallow depth of an object, it is possible to perform cross-type focus detection in the 45° oblique directions which enables to execute focus detection with higher accuracy, in addition to the focus detection in the longitudinal and shorter side directions of the opening 110a. This makes it possible to improve the accuracy of the focus detection processing.

Returning to FIG. 1, the control unit 80 controls the focus adjustment lens of the imaging lens 10 to adjust the focus of the imaging lens 10, based on the focus state (an out-of-focus direction and a defocus amount) of the imaging lens 10 detected by the focus detection apparatus 100. More specifically, the control unit 80 calculates the drive amount of the focus adjustment lens based on the out-of-focus direction and defocus amount of the imaging lens 10, and transmits a calculation result to an imaging lens side control unit (not shown). The imaging lens side control unit drives the focus adjustment lens via a motor or the like based on the drive amount of the focus adjustment lens acquired from the control unit 80.

The operation of the image capturing apparatus 1 will be explained next.

In observing a finder, light which has passed through the imaging lens 10 is reflected by the main mirror 20, forms an image on the focusing glass 32, and is observed by the user via the pentaprism 34 and the eyepiece lens 36. Light which has passed through the main mirror 20 is reflected by the sub-mirror 40, and enters the focus detection apparatus 100. As described above, the focus detection apparatus 100 can detect the focus state of the imaging lens 10 with high accuracy. Based on a detection result, the control unit 80 and the imaging lens side control unit (not shown) drive a focus lens included in the imaging lens 10, and obtain an in-focus state.

On the other hand, in capturing an image (in acquiring an image for recording, that is, actually capturing an image), the main mirror 20 and the sub-mirror 40 are removed from the image capturing optical path, and light which has passed through the imaging lens 10 is captured by the image sensor 50. The image capturing apparatus 1 can detect the focus of the imaging lens 10 with high accuracy using the focus detection apparatus 100, and also adjust the focus of the imaging lens 10 based on a detection result, thereby capturing a high-quality image. As described above, the focus detection apparatus 100 can prevent itself from becoming large, and keep the cost down. Therefore, the image capturing apparatus 1 using the focus detection apparatus 100 can also prevent itself from becoming large, and keep the cost down.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-256541, filed Nov. 9, 2009, which is hereby incorporated by reference herein in its entirety.

What is claimed is:

1. A focus detection apparatus for dividing a light beam which has passed through an imaging lens, and detecting a focus state of the imaging lens in accordance with a relative positional relationship between a plurality of images formed by the divided light beams, comprising:
   a field mask which has a rectangular opening for limiting the light beam that has passed through the imaging lens;
   a first focus detection optical system which divides, in a longitudinal direction of the opening or a shorter side direction of the opening, the light beam limited by the opening;
   a second focus detection optical system which divides, in an oblique direction different from the longitudinal direction or the shorter side direction, the light beam limited by the opening;
   a plurality of first focus detection regions which respectively extend in the dividing direction by the first focus detection optical system within a frame on an expected imaging surface of the imaging lens that receives the light beam divided by the first focus detection optical system; and
   a plurality of second focus detection regions which respectively extend in the dividing direction by the second focus detection optical system within the frame that receives the light beam divided by the second focus detection optical system,
   the plurality of second focus detection regions being aligned in the longitudinal direction or the shorter side direction within the frame.

2. The apparatus according to claim 1, wherein
   the second focus detection optical system divides, in the oblique direction, the light beam limited by the opening, and
   the plurality of second focus detection regions are aligned in the longitudinal direction within the frame, and respectively extend in the oblique direction.

3. The apparatus according to claim 1, wherein an interval of the plurality of second focus detection regions is smaller than that of the plurality of first focus detection regions.

4. The apparatus according to claim 1, wherein
   the plurality of first focus detection regions perform focus detection using light beam with an F-number equal to or smaller than a first F-number of the imaging lens, and
   the plurality of second focus detection regions perform focus detection using light beam with an F-number equal to or smaller than a second F-number of the imaging lens, which is smaller than the first F-number.

5. A focus detection apparatus for dividing a light beam which has passed through an imaging lens, and detecting a focus state of the imaging lens in accordance with a relative positional relationship between a plurality of images formed by the divided light beams, comprising:
   a field mask which has a rectangular opening for limiting the light beam that has passed through the imaging lens;
   a first focus detection optical system which divides, in a first direction of the opening or a second direction of the opening, the light beam limited by the opening;
   a second focus detection optical system which divides, in a third direction different from the first direction or the second direction, the light beam limited by the opening;
   a plurality of first focus detection regions which respectively extend in the dividing direction by the first focus detection optical system within a frame on an expected imaging surface of the imaging lens that receives the light beam divided by the first focus detection optical system; and a plurality of second focus detection regions which respectively extend in the dividing direction by the second focus detection optical system within the frame that receives the light beam divided by the second focus detection optical system, the plurality of second focus detection regions being aligned in the first direction or the second direction within the frame.

\* \* \* \* \*